United States Patent
Kim et al.

(10) Patent No.: US 10,310,168 B2
(45) Date of Patent: Jun. 4, 2019

(54) LIGHT GUIDE PLATE, BACKLIGHT UNIT HAVING THE SAME, DISPLAY APPARATUS HAVING THE SAME, AND METHOD OF MANUFACTURING THE SAME

(71) Applicant: Samsung Display Co., Ltd., Yongin, Gyeonggi-Do (KR)

(72) Inventors: Hyoung-Joo Kim, Anyang-si (KR); Sunhee Oh, Anyang-si (KR); Dongyeon Kang, Seoul (KR)

(73) Assignee: Samsung Display Co., Ltd. (KR)

( * ) Notice: Subject to any disclaimer, the term of this patent is extended or adjusted under 35 U.S.C. 154(b) by 313 days.

(21) Appl. No.: 14/817,958

(22) Filed: Aug. 4, 2015

(65) Prior Publication Data
US 2016/0097894 A1   Apr. 7, 2016

(30) Foreign Application Priority Data
Oct. 7, 2014   (KR) .......................... 10-2014-0135076

(51) Int. Cl.
*F21V 8/00* (2006.01)

(52) U.S. Cl.
CPC ............ *G02B 6/0065* (2013.01); *G02B 6/002* (2013.01); *G02B 6/0036* (2013.01); *G02B 6/0055* (2013.01); *G02B 6/0061* (2013.01)

(58) Field of Classification Search
CPC ................................................. G02B 6/0036
See application file for complete search history.

(56) References Cited

U.S. PATENT DOCUMENTS

| 7,455,443 B2 | 11/2008 | Sakurai et al. |
| 8,471,975 B2 | 6/2013 | Lee |
| 2005/0270802 A1 | 12/2005 | Hsu et al. |
| 2010/0014316 A1 | 1/2010 | Yue |
| 2011/0103091 A1* | 5/2011 | Kunimochi .......... G02B 6/0046 362/611 |
| 2012/0258191 A1 | 10/2012 | Kim et al. |
| 2013/0242613 A1 | 9/2013 | Kurata et al. |

(Continued)

FOREIGN PATENT DOCUMENTS

| CN | 1900793 A | 1/2007 |
| CN | 201867507 U | 6/2011 |
| CN | 103307510 A | 9/2013 |

(Continued)

OTHER PUBLICATIONS

EP15188053 Search Report dated Mar. 18, 2016 (9 pages.).

*Primary Examiner* — Anh T Mai
*Assistant Examiner* — Zachary J Snyder
(74) *Attorney, Agent, or Firm* — Innovation Counsel LLP

(57) ABSTRACT

A light guide plate includes a light incident surface to which a light is configured to be incident, a light exit surface from which the light incident through the light incident surface is configured to exit, a bottom surface facing the light exit surface configured to reflect at least a portion of the incident light, and a scattering pattern disposed on the bottom surface. The scattering pattern includes a first protrusion portion protruding from the bottom surface, a recess portion disposed along a circumference of the first protrusion portion and recessed from the bottom surface and a second protrusion portion spaced apart from the first protrusion portion and disposed along a portion of the recess portion.

12 Claims, 13 Drawing Sheets

(56) References Cited

U.S. PATENT DOCUMENTS

2014/0085930 A1 3/2014 Hua et al.
2016/0047972 A1* 2/2016 Kim .................... G02B 6/0055
362/606

FOREIGN PATENT DOCUMENTS

| EP | 1746457 A1 | 1/2007 |
|----|---|---|
| KR | 1020120057147 A | 6/2012 |
| KR | 1020120139277 A | 12/2012 |
| KR | 1020130034731 A | 4/2013 |
| KR | 1020130035312 A | 4/2013 |
| KR | 1020130118160 A | 10/2013 |

* cited by examiner

LIGHT GUIDE PLATE, BACKLIGHT UNIT HAVING THE SAME, DISPLAY APPARATUS HAVING THE SAME, AND METHOD OF MANUFACTURING THE SAME

CROSS-REFERENCE TO RELATED APPLICATION

This U.S. non-provisional patent application claims priority under 35 U.S.C. § 119 of Korean Patent Application No. 10-2014-0135076, filed on Oct. 7, 2014, the contents of which are hereby incorporated by reference in its entirety.

BACKGROUND

1. Field of Disclosure

The present disclosure relates to a light guide plate, a backlight unit having the same, a display apparatus having the same, and a method of manufacturing the same. More particularly, the present disclosure relates to a light guide plate formed by an extrusion method, a backlight unit having the light guide plate, a display apparatus having the light guide plate, and a method of manufacturing the light guide plate.

2. Description of the Related Art

In general, a flat panel display apparatus includes a display panel to display an image, a backlight unit to provide light to the display panel, and a bottom chassis to accommodate the backlight unit.

The backlight unit is classified into an edge-illumination type backlight unit and a direct-illumination type backlight unit according to a position of a light source. The light source is disposed at a rear side of the display panel in the direct-illumination type backlight unit and the light source is disposed at a rear side to be adjacent to an edge of the display panel in the edge-illumination type backlight unit.

In the edge-illumination type backlight unit, a light guide plate is used to guide the light emitted from the light source to the display panel. The light guide plate changes a path of the light provided from the light source to guide the light to the display panel.

Meanwhile, as the market demand for small and thin display apparatus continues to increase, researches have been carried out to reduce a thickness of the light guide plate. However, there a limitation to reduce the thickness of the light guide plate using an injection method widely used to manufacture the light guide plate.

SUMMARY

The present disclosure provides a light guide plate manufactured by using an extrusion method.

The present disclosure provides a backlight unit having the light guide plate manufactured by the extrusion method.

The present disclosure provides a display apparatus having the light guide plate manufactured by the extrusion method.

The present disclosure provides a method of manufacturing the light guide plate using the extrusion method.

The present disclosure provides an extrusion roller and/or a roll stamper used to manufacture the light guide plate.

Embodiments of the inventive concept provide a light guide plate including a light incident surface to which a light is configured to be incident, a light exit surface from which the light incident through the light incident surface is configured to exit, a bottom surface facing the light exit surface configured to reflect at least a portion of the incident light, and a scattering pattern disposed on the bottom surface. The scattering pattern includes a first protrusion portion protruding from the bottom surface, a recess portion disposed along a circumference of the first protrusion portion and recessed from the bottom surface, and a second protrusion portion spaced apart from the first protrusion portion and disposed along a portion of the recess portion.

The first protrusion portion has a circular shape and the second protrusion portion is disposed in a first region with respect to an imaginary line crossing a center of the first protrusion portion and dividing the scattering pattern into the first region and a second region.

The first protrusion portion has a height different from a height of the second protrusion portion, and the height of the first protrusion portion is greater than the height of the second protrusion portion.

The light exit surface includes a slant surface disposed adjacent to the light incident surface and slanted towards the bottom surface and the slant surface becomes farther away from the bottom surface as a distance from the light incident surface becomes smaller. The light exit further includes a first flat surface substantially parallel to the bottom surface and a second flat surface disposed between the light incident surface and the slant surface and substantially parallel to the bottom surface.

The scattering pattern is provided in a plural number and the scattering patterns have different sizes from each other. The scattering patterns are regularly arranged along at least one of row and column directions.

The first protrusion portion of each of the scattering patterns has a circular shape, the second protrusion portion is disposed in a first region with respect to imaginary lines each crossing a center of the first protrusion portion and dividing a corresponding scattering pattern of the scattering patterns into the first region and a second region, and the imaginary lines are substantially parallel to each other. The first region is more spaced apart from the light incident surface than the second region.

Embodiments of the inventive concept provide a backlight unit including a light source configured to emit a light and the light guide plate as described above.

The backlight unit further includes a reflection plate disposed under the bottom surface configured to reflect the light leaking from the bottom surface to the light exit surface. The reflection plate makes contact with at least one of the first protrusion portion and the second protrusion portion.

Embodiments of the inventive concept provide a display apparatus including a display panel and the backlight unit as described above.

Embodiments of the inventive concept provide a method of manufacturing a light guide plate, including pressurizing a material using an extrusion roller to form a mother light guide plate, cutting the mother light guide plate to form a light guide plate including a light exit surface including a first flat surface, a second flat surface, and a slant surface, and forming a scattering pattern on an opposite surface to the light exit surface using a roll stamper.

Embodiments of the inventive concept provide an extrusion roller for a light guide plate, including a first body having a cylindrical shape and configured to rotate with respect to an axis and a first outer circumference portion wrapping the first body along an outer circumference of the first body. The first outer circumference portion includes a first outer circumference surface having a first radius with respect to the axis, a second outer circumference surface having a second radius smaller than the first radius with respect to the axis, and a counter-slant surface connecting the first outer circumference surface and the second outer circumference surface.

The first outer circumference surface, the counter-slant surface, and the second outer circumference surface form one light guide plate-forming unit and the light guide plate-forming unit is provided in a plural number along a direction in which the axis extends.

The first outer circumference surface of one light guide plate-forming unit among the light guide plate-forming units is directly connected to the first outer circumference surface of another light guide plate-forming unit adjacent to the one light guide plate-forming unit among the light guide plate-forming units, and the second outer circumference surface of the one light guide plate-forming unit among the light guide plate-forming units is directly connected to the second outer circumference surface of the other light guide plate-forming unit adjacent to the one light guide plate-forming unit among the light guide plate-forming units. The first body is integrally formed with the first outer circumference portion.

Embodiments of the inventive concept provide a roll stamper for a light guide plate, including a body having a cylindrical shape and configured to rotate with respect to an axis and an outer circumference portion wrapping the body along an outer circumference of the body and including a transfer pattern protruding from or recessed from a surface thereof.

The transfer pattern includes has a reversed shape of the first protrusion portion and the recess portion of the light guide plate. The transfer pattern includes a recess recessed from the surface and a protrusion portion disposed along a circumference of the recess and protruding from the surface.

When the roll stamper travels from one end of the light guide plate to the other end of the light guide plate to transfer the transfer pattern, the second protrusion portion is disposed closer to the other end than the one end as viewed relative to the first protrusion portion.

According to the above, the thickness of the light guide plate manufactured by the extrusion method becomes thin.

In addition, the thickness of the backlight unit and the display apparatus may be reduced due to the light guide plate manufactured by the extrusion method.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

Figure 1:
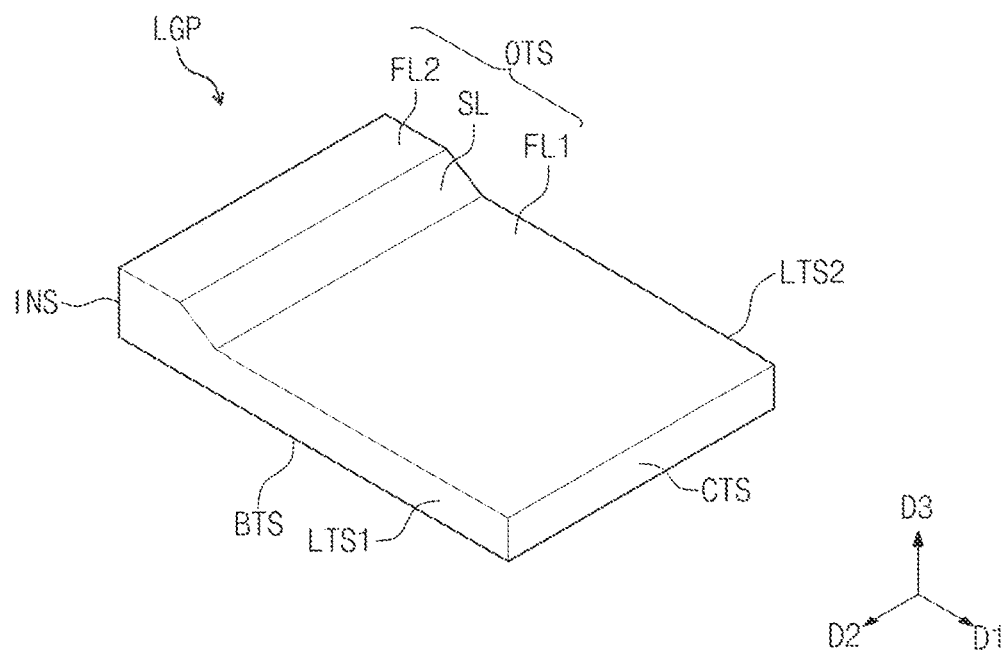
FIG. 1 is a perspective view showing a light guide plate according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments will be explained in detail with reference to the accompanying drawings.

Figure 2:
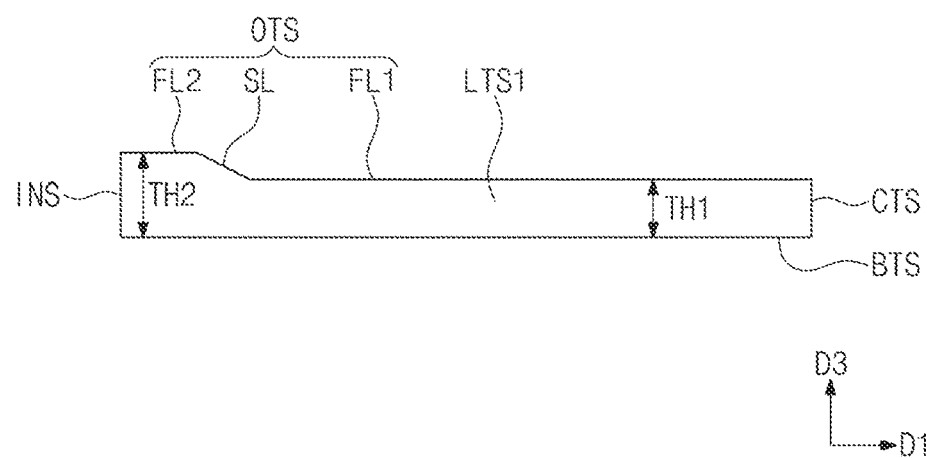
FIG. 2 is a side view showing the light guide plate shown in FIG. 1.

FIG. 1 is a perspective view showing a light guide plate LGP according to an exemplary embodiment of the present disclosure and FIG. 2 is a side view showing the light guide plate LGP shown in FIG. 1.

For the convenience of explanation, a direction in which an image is displayed in a display apparatus is referred to as an upper direction and a direction opposite to the upper direction is referred to as a lower direction, but they should not be limited thereto or thereby.

In the present exemplary embodiment, the light guide plate LGP is used in the display apparatus and guides a light emitted from a light source to a predetermined direction. The light guide plate LGP according to the present exemplary embodiment is used in a backlight unit of the display apparatus. Accordingly, the light guide plate, the backlight unit, and the display apparatus including the backlight unit are sequentially described in the following description, and then a manufacturing method of the light guide plate LGP is described.

Referring to FIGS. 1 and 2, the light guide plate LGP has a substantially quadrangular plate shape, particularly rectangular plate shape. For instance, the light guide plate LGP has two long sides extending in a first direction D1 and two short sides extending in a second direction D2 substantially perpendicular to the first direction D1 when viewed in a plan view. However, the shape of the light guide plate LGP should not be limited to the quadrangular shape according to a shape of an apparatus to which the light guide plate LGP is applied.

The light guide plate LGP includes a light incident surface INS to which a light emitted from a light source part (not shown) is incident, a light exit surface OTS from which the light incident through the light incident surface INS exits, and a bottom surface BTS facing the light exit surface OTS to reflect the light.

The light incident surface INS is a surface to which the light is incident. When the light source part is disposed to face at least one side surfaces of side surfaces connecting two largest surfaces of the light guide plate LGP, the one side surface serves as the light incident surface INS. The light emitted from the light source part is incident to the light guide plate LGP through the light incident surface INS.

The light exit surface OTS corresponds to one surface of the two largest surfaces of the light guide plate LGP and is connected to the light incident surface INS. In the present exemplary embodiment, the light exit surface OTS corresponds to an upper surface of the light guide plate LGP.

The bottom surface BTS is connected to the light incident surface INS and faces the light exit surface OTS. The bottom surface BTS corresponds to the other surface of the two largest surfaces of the light guide plate LGP. In the present exemplary embodiment, the bottom surface BTS corresponds to a lower surface of the light guide plate LGP. The light incident to the light guide plate LGP through the light incident surface INS may be reflected between the light exit surface OTS and the bottom surface BTS while traveling between the light exit surface OTS and the bottom surface BTS and exits in the upward direction, i.e., a third direction D3, through the light exit surface OTS. A scattering pattern (not shown) is disposed on the bottom surface BTS to scatter the light reflected by the bottom surface BTS. The scattering pattern will be described in detail later.

The light guide plate LGP includes four side surfaces except for the light exit surface OTS and the bottom surface BTS. Among the four side surfaces, the side surface facing the light source part and extending in the second direction D2 corresponds to the light incident surface INS. In addition, among the four side surfaces, a side surface facing the light incident surface INS and extending in the second direction D2 is referred to as an opposite surface CTS. A side surface disposed between the light incident surface INS and the opposite surface CTS and extending in the first direction D1 is referred to as a first side surface LTS1, and a side surface substantially parallel to the first side surface LTS1 is referred to as a second side surface LTS2.

In the present exemplary embodiment, the light exit surface OTS is provided with a slant surface SL disposed adjacent to the light incident surface INS and slanted toward the bottom surface BTS. The slant surface SL is slanted to a direction to be farther away from the bottom surface BTS as a distance from the light incident surface INS decreases. The slant surface SL is disposed to be closer to the light incident surface INS than the opposite surface CTS.

According to the present exemplary embodiment, the light exit surface OTS further includes a first flat surface FL1 substantially parallel to the bottom surface BTS and a second flat surface FL2 disposed between the light incident surface INS and the slant surface SL and substantially parallel to the bottom surface BTS. Accordingly, the slant surface SL is disposed between the first and second flat surfaces FL1 and FL2.

The second flat surface FL2 extends from the light incident surface INS corresponding to the one side surface of the light guide plate LGP to a direction substantially parallel to the bottom surface BTS. The slant surface SL extends from one end of the second flat surface FL2 and is slanted with respect to the bottom surface BTS at a predetermined angle. The first flat surface FL1 extends from a lower end of the slant surface SL to an upper end of the opposite surface CTS, which is disposed to face the light incident surface INS, to be substantially parallel to the bottom surface BTS.

In the light guide plate LGP, when a distance between the bottom surface BTS and the light exit surface OTS is referred to as a thickness of the light guide plate LGP, the light guide plate LGP has a thickness varying depending on a position thereof, at which the thickness is measured. In the present exemplary embodiment, the thickness between the bottom surface BTS and the first flat surface FL1 and the thickness between the bottom surface BTS and the second flat surface FL2 are respectively referred to as first and second thicknesses TH1 and TH2. The second thickness TH2 is greater than the first thickness TH1. The first and second thicknesses TH1 and TH2 are determined depending on various factors, e.g., a width against the light incident surface INS of the light guide plate LGP, a kind of the display apparatus employing the light guide plate LGP, a size of the display apparatus employing the light guide plate LGP, etc. The first and second thicknesses TH1 and TH2 are set to allow an amount of the light incident to the light guide plate LGP from the light source part to be maximum.

Figure 3:
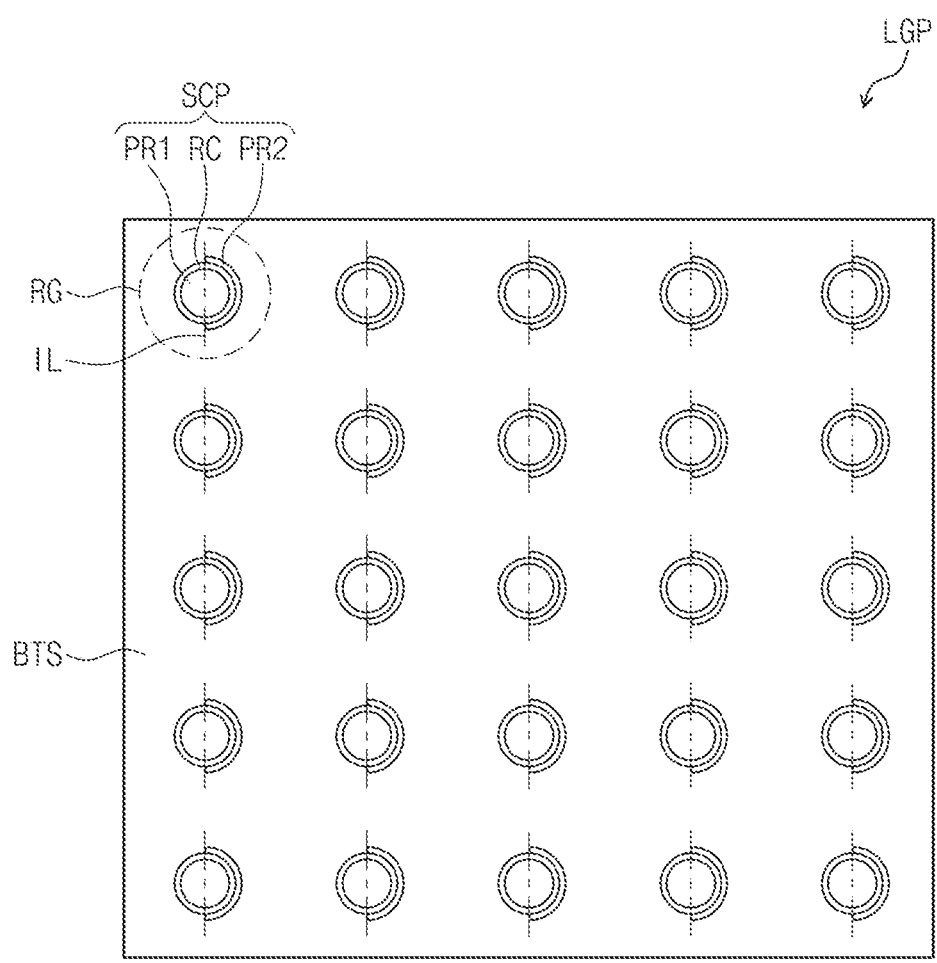
FIG. 3 is a plan view showing a bottom surface of a light guide plate according to an exemplary embodiment of the present disclosure.
Figure 4:
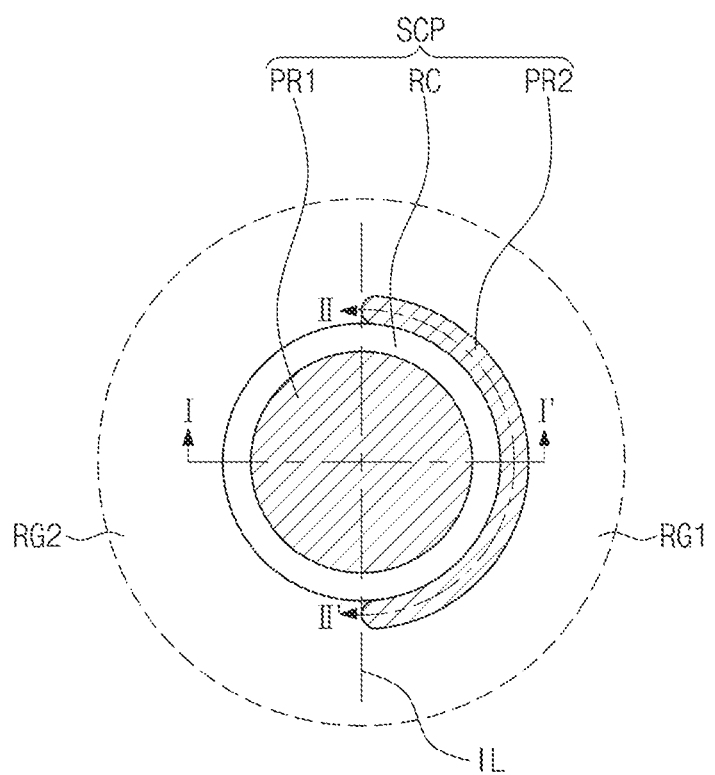
FIG. 4 is an enlarged plan view shoring a circular area indicated by a dotted line shown in FIG. 3.
Figure 5:
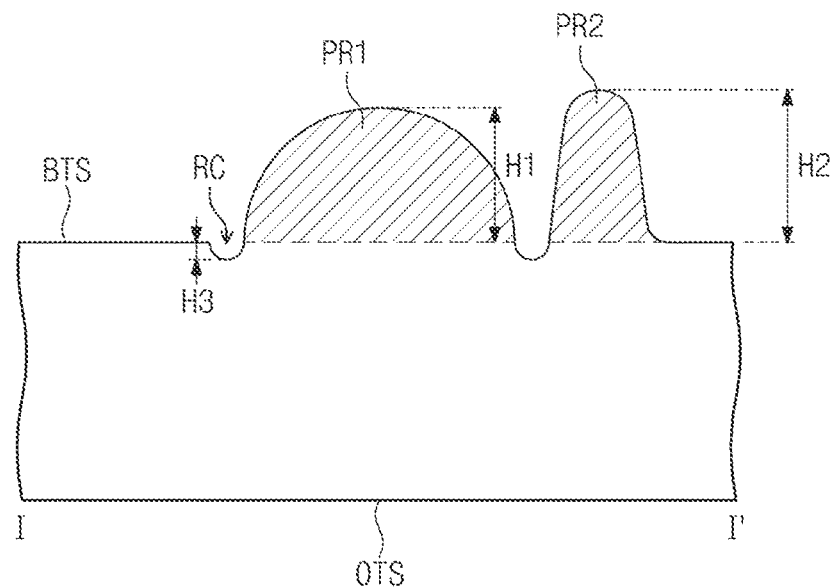
FIG. 5 is a cross-sectional view taken along a line I-I' of FIG. 4.
Figure 6:
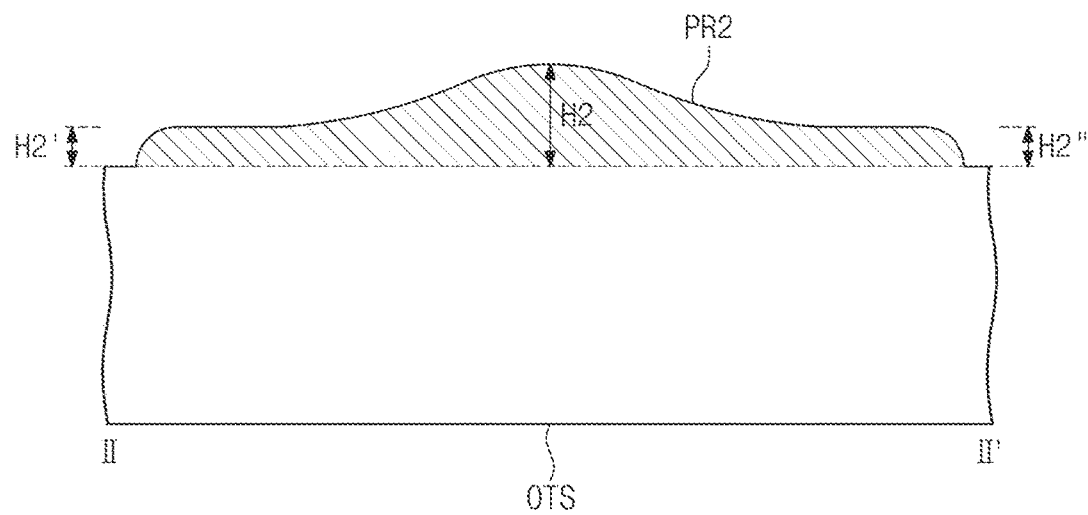
FIG. 6 is a cross-sectional view taken along a line II-II' of FIG. 4.

FIG. 3 is a plan view showing a bottom surface BTS of a light guide plate LGP according to an exemplary embodiment of the present disclosure, FIG. 4 is an enlarged plan view showing a circular area indicated by a dotted line shown in FIG. 3, FIG. 5 is a cross-sectional view taken along a line FIG. 4, and FIG. 6 is a cross-sectional view taken along a line II-II' of FIG. 4.

Referring to FIG. 3, the light guide plate LGP includes the scattering pattern SCP disposed on the bottom surface BTS.

The scattering pattern SCP is provided in a plural number and scatters the light incident through the light incident surface INS and traveling to the bottom surface BTS such that the light travels to the light exit surface OTS of the light guide plate LGP. In the present exemplary embodiment, the scattering patterns SCP are disposed on the bottom surface BTS to face the first flat surface FL1 (refer to FIG. 1), but they should not be limited thereto or thereby. According to another embodiment, the scattering patterns SCP are disposed on the bottom surface BTS to face the slant surface SL (refer to FIG. 1) or the second flat surface FL2 (refer to FIG. 1).

In the present exemplary embodiment, the scattering patterns SCP are arranged in a matrix form of plural rows by plural columns. As an example, FIG. 3 shows the scattering patterns SCP arranged in the matrix form, but the arrangement of the scattering patterns SCP should not be limited to the matrix form. That is, the scattering patterns SCP may be irregularly arranged in at least one direction of the row and column directions or randomly arranged regardless of the row and column directions. In addition, a portion of the scattering patterns SCP may be regularly arranged and the other portion of the scattering patterns SCP may be irregularly arranged along the row or column direction. The scattering patterns SCP have the same size, but they should not be limited thereto or thereby. That is, the scattering patterns SCP may have different sizes from each other.

Hereinafter, since the scattering patterns SCP have the same size, only one scattering pattern SCP will be described in detail as a representative example.

Referring to FIGS. 4 to 6, the scattering pattern SCP includes a protrusion portion protruded from the bottom surface BTS and a recess portion RC recessed from the bottom surface BTS. The protrusion portion is configured to include a first protrusion portion PR1 and a second protrusion portion PR2.

In more detail, the scattering pattern SCP includes the first protrusion portion PR1 protruded from the bottom surface BTS, the recess portion RC provided along a circumference of the first protrusion portion PR1 and recessed from the bottom surface BTS, and the second protrusion portion PR2 spaced apart from the first protrusion portion PR1 and provided along a portion of the recess portion RC.

The first and second protrusion portions PR1 and PR2 are integrally formed with the light guide plate LGP. The first protrusion portion PR1 has a hemisphere shape protruded from the bottom surface BTS and has a substantially circular shape when viewed in a plan view.

The recess portion RC is provided along the circumference of the first protrusion portion PR1 when viewed in a plan view. The recess portion RC has a ring shape disposed adjacent to the first protrusion portion PR1.

The second protrusion portion PR2 is provided to correspond to a portion of outer circumference of the recess portion RC. The second protrusion portion PR2 is spaced apart from the first protrusion portion PR1 such that the recess portion RC is disposed between the first and second protrusion portions PR1 and PR2.

For the sake of clarity in explanation, a line crossing a center of the first protrusion portion PR1 having the circular shape and dividing the first protrusion portion PR1 and the scattering pattern SCP into two regions is referred to as an imaginary line IL, one region of the two regions divided by the imaginary line IL is referred to as a first region RG1, and the other region of the two regions is referred to as a second region RG2.

The second protrusion portion PR2 is disposed in the first region RG1 of the two regions RG1, RG2 divided by the imaginary line IL. That is, the second protrusion portion PR2 is formed at the portion of the outer circumference of the recess portion RC disposed in the first region RG1.

In the present exemplary embodiment, the second protrusion portion PR2 is formed to correspond to all or the portion of the outer circumference of the recess portion RC disposed in the first region RG1 and is not formed at the outer circumference of the recess portion RC disposed in the second region RG2.

For instance, the second protrusion portion PR2 is formed along the portion of the outer circumference of the recess portion RC in the first region RG1. According to the present exemplary embodiment, the second protrusion portion PR2 is formed along the entire outer circumference of the recess portion RC disposed in the first region RG1. In other words, the second protrusion portion PR2 is formed in a region corresponding to a half, i.e., about 50%, of the outer circumference of the recess portion RC and is not formed in a region corresponding to the other half of the outer circumference of the recess portion RC. That is, in another embodiment, the second protrusion portion PR2 is successively formed along the portion corresponding to the half, i.e., about 50%, of the outer circumference of the recess portion RC.

However, the shape of the second protrusion portion PR2 should not be limited thereto or thereby. That is, the second protrusion portion PR2 is mainly formed in the first region RG1, but a portion of the second protrusion portion PR2 extends in the second region RG2. In other words, the second protrusion portion PR2 is formed to correspond to all or the portion of the outer circumference of the recess portion RC disposed in the first region RG1 and the portion of the second protrusion portion PR2 extends in the second region RG2 to correspond to a portion of the recess portion RC disposed in the second region RG2.

As described above, the structure that the second protrusion portion PR2 is formed only in the first region RG1 and not formed in the second region RG2 is caused by a manufacturing method of the scattering pattern SCP. This will be described in detail later.

In the present exemplary embodiment, the first protrusion portion PR1 has a height H1 equal to or different from a height H2 of the second protrusion portion PR2. Heights H1, H2 are measured relative to a plane of the bottom surface BTS in one example. For instance, the height H2 of the second protrusion portion PR2 may be greater than the height H1 of the first protrusion portion PR1 as shown in FIG. 5, but the heights H1 and H2 of the first and second protrusion portions PR1 and PR2 should not be limited thereto or thereby. According to another embodiment, the height H2 of the second protrusion portion PR2 may be smaller than the height H1 of the first protrusion portion PR1. The recess portion RC has a depth H3 smaller than the heights H1 and H2 of the first protrusion portion PR1 or the second protrusion portion PR2, but it should not be limited thereto or thereby. In an embodiment, the depth H3 of the recess portion RC is measured at a position at which a distance between the bottom surface BTS, e.g., the plane thereof, and a surface defining the recess portion RC is largest.

The height H2 of the second protrusion portion PR2 is gradually varied according to positions thereof. Referring to FIGS. 4 and 6, the second protrusion portion PR2 has an arc shape formed along the circumference of the recess portion RC when viewed in a plan view. The height H2 of the second protrusion portion PR2 gradually increases from both ends to a center portion of the arc shape. In other words, heights H2' and H2" of the second protrusion portion PR2 at both ends of the arc shape, i.e., both ends of the second protrusion portion PR2 adjacent to the imaginary line IL, are smaller than the height H2 of the second protrusion portion PR2 at a position farthest away from the imaginary line IL. In this case, the height H2' at one end of the second protrusion portion PR2 may be equal to the height H2" at the other end of the second protrusion portion PR2, but it should not be limited thereto or hereby.

Referring to FIG. 3 again, each first protrusion portion PR1 is divided into the first and second regions RG1 and RG2 by the imaginary line IL and the second protrusion portion PR2 is formed in the first region RG1. The imaginary lines IL shown in FIG. 3 are substantially parallel to each other. The imaginary lines IL are substantially parallel to a direction substantially perpendicular to a direction in which the light incident surface INS extends.

Figure 7:
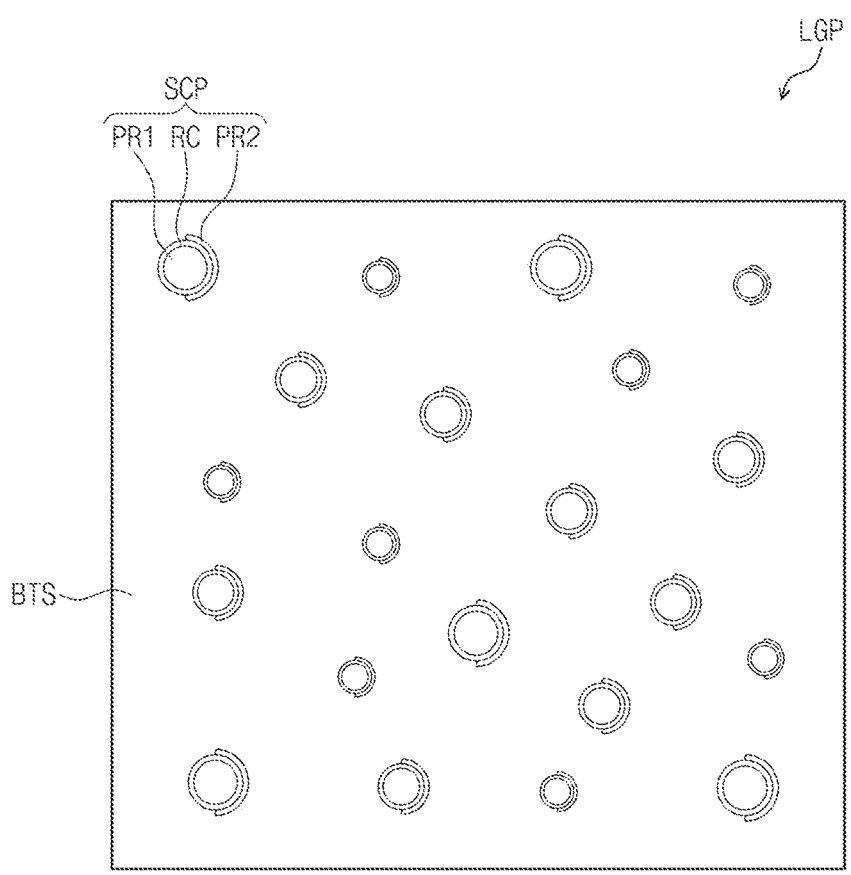
FIG. 7 is a plan view showing a bottom surface of a light guide plate according to another exemplary embodiment of the present disclosure.

FIG. 7 is a plan view showing a bottom surface of a light guide plate LGP according to another exemplary embodiment of the present disclosure.

Referring to FIG. 7, a scattering pattern SCP according to the present exemplary embodiment is provided in a plural number and the scattering patterns SCP have different sizes. In detail, first protrusion portions PR1 of the scattering patterns SCP have different sizes and different radiuses when viewed in a plan view. Although not shown in FIG. 7, each scattering pattern SCP has a relatively small size in a region closer to the light incident surface INS and the size of the scattering patterns SCP becomes greater as a distance from the light incident surface INS becomes greater.

The arrangement of the scattering patterns SCP should not be limited thereto or thereby and the number, size, arrangement manner, and density of the scattering patterns SCP may be variously changed. For instance, the scattering patterns SCP are arranged in a zigzag shape or randomly arranged. In addition, the scattering patterns SCP are arranged such that the density thereof is increased as the distance from the light incident surface INS becomes large. In an embodiment, the density of the scattering patterns SCP indicates the number of the scattering patterns SCP or an area of the scattering patterns SCP per unit area.

Figure 8:
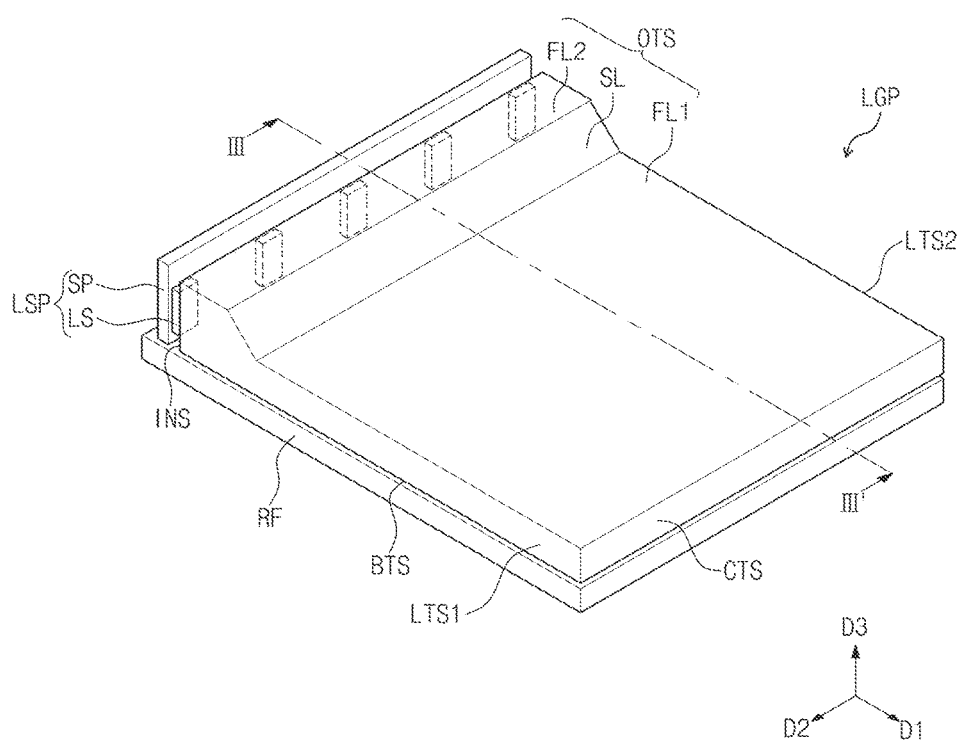
FIG. 8 is a perspective view showing a portion of a backlight unit according to an exemplary embodiment of the present disclosure.
Figure 9:
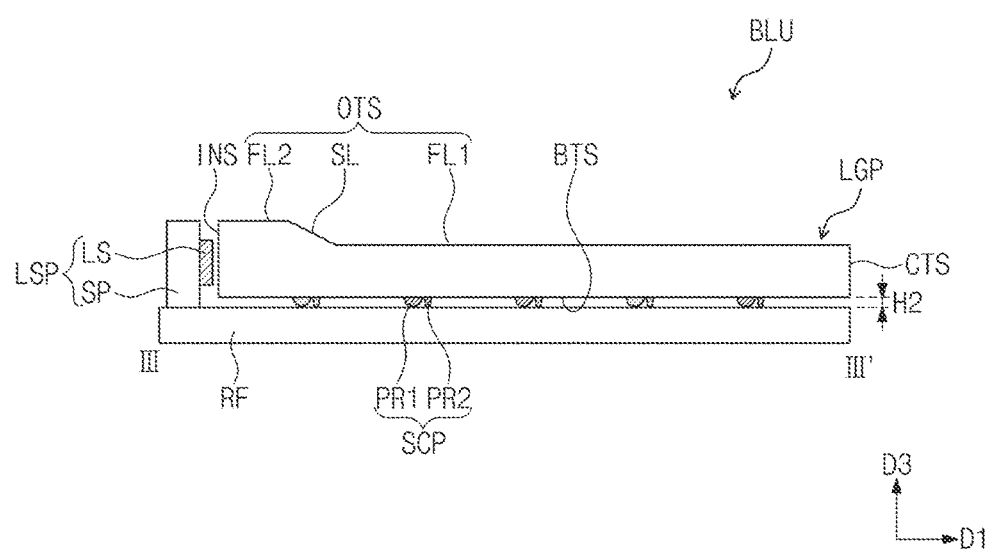
FIG. 9 is a cross-sectional view taken along a line III-III' of FIG. 8.

FIG. 8 is a perspective view showing a portion of a backlight unit according to an exemplary embodiment of the present disclosure and FIG. 9 is a cross-sectional view taken along a line III-III' of FIG. 8. For the convenience of explanation, optical sheets are omitted in FIG. 8.

Referring to FIGS. 8 and 9, the backlight unit BLU according to the present exemplary embodiment may employ the above-mentioned light guide plate LGP. Hereinafter, parts not previously described will be mainly described.

Referring to FIGS. 8 and 9, the backlight unit BLU includes a light source part LSP, a light guide plate LGP, and a reflection plate RF.

The light source part LSP generates the light. The light source part LSP includes a plurality of light sources LS and a support part SP supporting the light sources LS. The support part SP may be, but not limited to, a circuit board on which wires used to apply a voltage source to the light sources LS are printed. The support part SP has a substantially rectangular plate shape elongated in one direction.

Each light source LS may be, but is not limited to, a point light source, a line light source, or a surface light source. As an example, the point light source, e.g., a light emitting diode, will described as the light source LS. The light emitting diode is provided in a plural number and the light emitting diodes are arranged in a line on the support part SP. In an embodiment, the light source LS means a minimum light emitting unit, which is able to individually control an amount of the light emitted therefrom. Thus, one light source is configured to include one light emitting diode or plural light emitting diodes of which the brightness of the light emitting diodes is substantially simultaneously controlled. In the present exemplary embodiment, the light source part LSP includes the support part SP and the light sources LS, but it should not be limited thereto or thereby. That is, the support part SP may be omitted. In this case, a separate supporting member to support the light sources LS and/or separate wirings to apply the voltage source to the light sources LS are prepared.

The light guide plate LGP includes the light incident surface INS to which the light is incident, the light exit surface OTS from which the light incident through the light incident surface INS exits, the bottom surface BTS facing the light exit surface OTS and reflecting the light, and the scattering pattern SCP disposed on the bottom surface BTS.

The light incident surface INS faces the light sources LS of the light source part LSP and the light emitted from the light sources LS is incident to the light guide plate LGP through the light incident surface INS.

The light exit surface OTS faces an object, e.g., a display panel (not shown), to which the light generated by the backlight unit is provided. That is, the object to which the light is provided, e.g., the display panel, is disposed on the light exit surface OTS. The light exiting from the light exit surface OTS travels to the object.

The light guide plate LGP is formed of a transparent material, e.g., polycarbonate (PC), polymethyl methacrylate (PMMA), etc. The light guide plate LGP may have flexibility caused by thickness, shape, and material thereof.

The light guide plate LGP may be substantially the same as the light guide plate LGP previously described in the exemplary embodiments, and thus details thereof will be omitted.

The reflection plate RF is disposed to face the bottom surface BTS. The reflection plate RF is disposed under the light source part LSP and the light guide plate LGP to reflect the light leaking from the light guide plate LGP without traveling to the display panel to the light exit surface OTS. Thus, an amount of the light provided to the light exit surface OTS is increased by the reflection plate RF.

The reflection plate RF has a single-layer structure, but it should not be limited thereto or thereby. That is, the reflection plate RF has a multi-layer structure of two or more layers.

The reflection plate RF is formed of polyethylene terephthalate (PET) and one surface of the reflection plate RF is coated by a diffusion layer containing titanium dioxide to have a reflection property.

The reflection plate RF is disposed to overlap with at least a portion of the bottom surface BTS of the light guide plate LGP. In the present exemplary embodiment, the bottom surface BTS of the light guide plate LGP is fully overlapped with the reflection plate RF, but the reflection plate RE may be overlapped with a portion of the bottom surface BTS corresponding to the first flat surface FL1 according to another exemplary embodiment.

The reflection plate RF makes contact with the first protrusion portion PR1 and/or the second protrusion portion PR2 of the scattering pattern SCP disposed on the bottom surface BTS of the light guide plate LGP. That is, the first protrusion portion PR1 and/or the second protrusion portion PR2 are/is provided between the bottom surface BTS of the light guide plate LGP and the reflection plate RF. The light guide plate LGP and the reflection plate RF are spaced apart from each other by the first protrusion portion PR1 and/or the second protrusion portion PR2, which serve(s) as a spacer member. Due to the first protrusion portion PR1 and/or the second protrusion portion PR2, the reflection plate RF is prevented from being directly attached to the bottom surface BTS. In addition, since an air layer is formed between the bottom surface BTS of the light guide plate LGP and the reflection plate RF, a reflection efficiency of the light traveling inside the light guide plate LGP is improved. When the height of the first protrusion portion PR1 is greater than the height of the second protrusion portion PR2, the first protrusion portion PR1 is used as the spacer member. When the height of the first protrusion portion PR1 is smaller than the height of the second protrusion portion PR2, the second protrusion portion PR2 is used as the spacer member. In FIG. 9, the height H2 of the second protrusion portion PR2 is greater than the height of the first protrusion portion PR1, and thus a distance between the reflection plate RF and the light guide plate LGP is indicated by "H2", i.e., height H2.

The number, size, and density of the scattering patterns SCP are controlled to appropriately maintain the distance between the light guide plate LGP and the reflection plate RF and to maximize the scattering amount of the light traveling inside the light guide plate LGP. The imaginary lines IL dividing the scattering patterns SCP are substantially parallel to each other.

Although not shown in figures, the backlight unit BLU further includes at least one optical sheet disposed on the light exit surface OTS of the light guide plate LGP to improve the efficiency of the light exiting from the light exit surface OTS.

The light guide plate LGP and the backlight unit BLU including the light guide plate LGP may be employed in a light-receiving type display apparatus.

Figure 10:
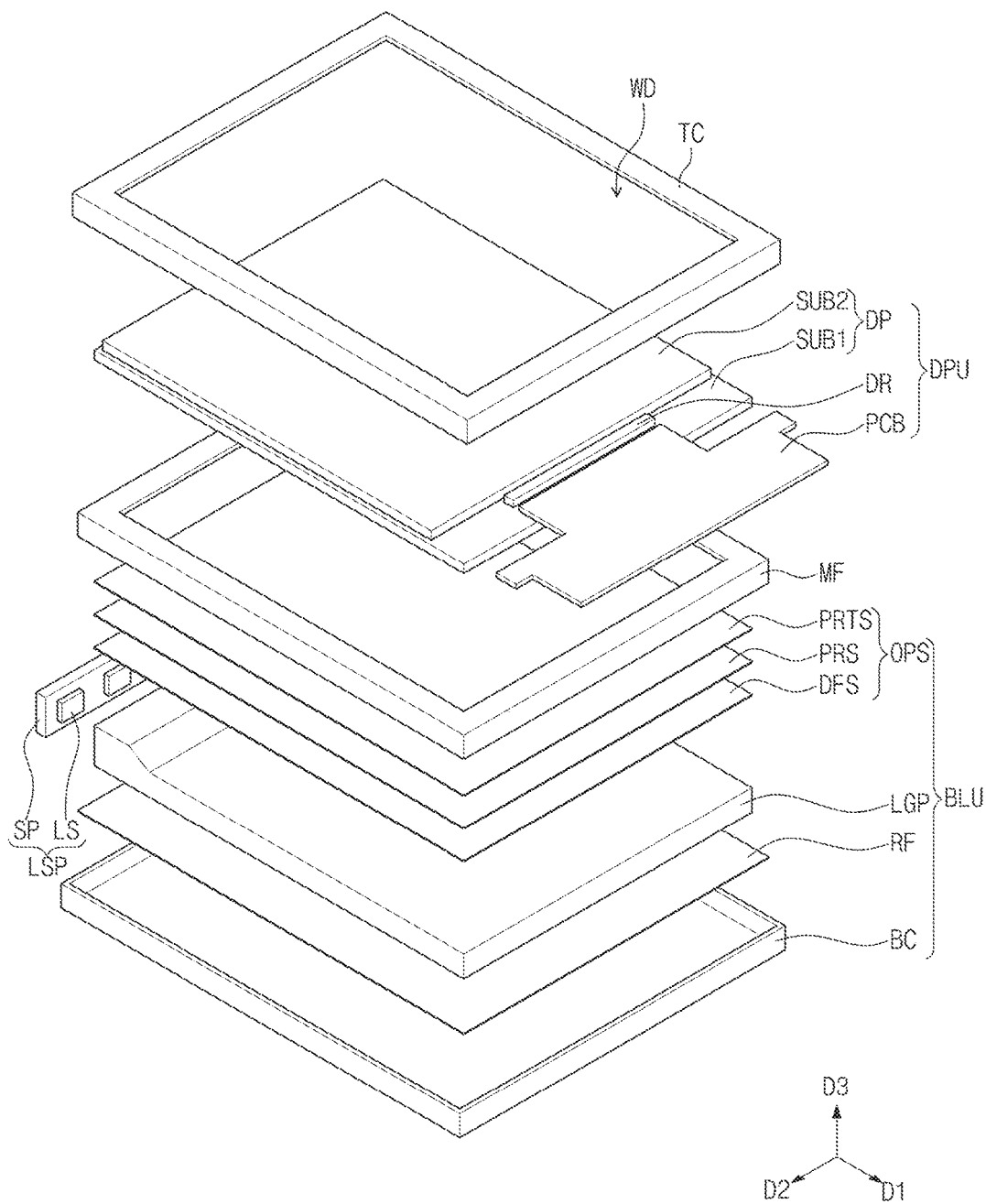
FIG. 10 is an exploded perspective view showing a display apparatus according to an exemplary embodiment of the present disclosure.

FIG. 10 is an exploded perspective view showing a display apparatus according to an exemplary embodiment of the present disclosure.

Referring to FIG. 10, the display apparatus includes a display unit DPU, a backlight unit BLU, a mold frame MF, a bottom chassis BC, and a top chassis TC.

The display apparatus has a substantially rectangular shape when viewed in a plan view. In the present exemplary embodiment, a short axis direction of the display apparatus is referred to as a first direction D1 and a long axis direction of the display apparatus is referred to as a second direction D2 substantially perpendicular to the first direction D1. In addition, the bottom chassis BC, the backlight unit BLU, the mold frame MF, the display unit DPU, and the top chassis TC of the display apparatus are sequentially stacked in a third direction D3 substantially perpendicular to the first and second directions D1 and D2.

The display panel DPU is a light-receiving type display panel, and various display panels, such as a liquid crystal display panel, an electrowetting display panel, an electrophoretic display panel, a microelectromechanical system display panel, etc., are used as the display panel DPU. In the present exemplary embodiment, the liquid crystal display panel will be described as the display panel DPU.

The display unit DPU includes a display panel DP to display an image, a driving chip DR to apply a driving signal to the display panel DP, and a printed circuit board PCB electrically connected to the display panel DP.

The display panel DP displays the image on a front surface thereof. The display panel DP includes a first substrate SUB1, a second substrate SUB2 facing the first substrate SUB1 and coupled to the first substrate SUB1, and a liquid crystal layer (not shown) interposed between the first substrate SUB1 and the second substrate SUB2. The display panel DP includes a display area (not shown) in which the image is displayed and a non-display area (not shown) surrounding the display area, in which the image is not displayed. The non-display area is covered by the top chassis TC.

The first substrate SUB1 includes a plurality of pixels arranged in a matrix form and each pixel includes a gate line (not shown), a data line (not shown) insulated from the gate line while crossing the gate line, and a pixel electrode (not shown). In addition, each pixel includes a thin film transistor (not shown) connected to the gate line, the data line, and the pixel electrode. The second substrate includes color pixels (not shown), e.g., red, green, and blue color pixels, and a common electrode (not shown) facing the pixel electrode. The color pixel and the common electrode may be disposed on the first substrate SUB1 according to another exemplary embodiment. The liquid crystal layer includes liquid crystal molecules aligned in accordance with an electric field generated between the pixel electrode and the common electrode to control a transmittance of the light provided from the backlight unit BLU, the by displaying a desired image.

When viewed in a plan view, the driving chip DR is disposed at at least one side portion of the first substrate SUB1 to apply a data signal to the data line. The driving chip DR generates the data signal applied to the display panel DP in response to an external signal. The external signal may be, but not limited to, a signal provided from the printed circuit board PCB and includes image signals, control signals, and driving voltages.

As another exemplary embodiment, the driving chip DR may be configured to include two or more chips, e.g., data and gate driving chips, and may be mounted on the first substrate SUB1 by a chip-on-glass method.

In the present exemplary embodiment, the printed circuit board PCB has flexibility. According to another embodiment, the printed circuit board PCB is electrically connected to the display panel DP by a plurality of tape carrier packages. The driving chip DR is mounted on each tape carrier package. The tape carrier packages are bent to cover amide surface of the bottom chassis BC. The printed circuit board PCB connected to the tape carrier packages is disposed under the bottom chassis BC. In this case, the display apparatus may further include a shield case (not shown) disposed under the bottom chassis BC to protect the printed circuit board PCB. Although not shown in FIG. 10, the printed circuit board PCB may be disposed on the side surface of the bottom chassis BC.

The backlight unit BLU is disposed under the display panel DP to provide the light to the display panel DP.

The backlight unit BLU includes the mold frame MF supporting the display panel DP, the light source part LSP generating the light, the light guide plate LGP receiving the light from the light source part LSP and guiding the light to the display unit DPU, one or more optical sheets OPS improving the efficiency of the light, and the reflection plate RF changing the optical path of the light.

The backlight unit BLU may be, but not limited to, an edge-illumination type backlight unit. That is, the light source part LSP of the backlight unit BLU is disposed at a lower portion of the display panel DP and provides the light to at least one side surface of the light guide plate LGP, and the light guide plate LGP guides the light to the display unit DPU.

The light guide plate LGP and the backlight unit BLU including the light guide plate LGP may be substantially the same as those described in the previous exemplary embodiments, and thus details thereof will be omitted.

The mold frame MF is provided along an edge of the display panel DP and disposed under the display panel DP to support the display panel DP. The mold frame MF includes a fixing member (not shown) to fix or support the light source part LSP and the optical sheets OPS. The mold frame MF is disposed at positions corresponding to four sides of the display panel DP or at least a portion of the four sides of the display panel DP. For instance, the mold frame ME has a substantially rectangular ring shape corresponding to the four sides of the display panel DP or a substantially laid U shape corresponding to three sides of the display panel DP. The mold frame MF may be integrally formed as a single unitary and individual unit, but may be configured to include plural parts assembled to form the mold frame MF. The mold frame MF may be formed of an organic material, e.g., a polymer resin, but it should not be limited thereto or thereby.

The light source part LSP provides the light to the display panel DP. Referring to FIGS. 1 to 3, the light guide plate LGP includes the light incident surface INS to which the light is incident, the light exit surface OTS from which the light incident through the light incident surface INS exits, the bottom surface BTS facing the light exit surface OTS and reflecting at least a portion of the incident light, and the scattering pattern SCP disposed on the bottom surface BTS.

In the present exemplary embodiment, the light exit surface OTS corresponds to the upper surface of the light guide plate LGP and faces the display panel DP. The light incident to the light guide plate LGP through the light incident surface INS travels to the display panel DP through the light exit surface OTS.

The bottom surface BTS is connected to the light incident surface INS and faces the light exit surface OTS. The bottom surface BTS corresponds to one of two largest surfaces of the light guide plate LGP. In the present exemplary embodiment, the bottom surface BTS corresponds to the lower surface of the light guide plate LGP. Most of the light incident to the light guide plate LGP through the light incident surface INS is reflected between the light exit surface OTS and the bottom surface BTS while traveling through the light guide plate LGP and exits through the light exit surface OTS to travel to the display panel DP.

According to the present exemplary embodiment, the light exit surface OTS further includes the first flat surface FL1 substantially parallel to the bottom surface BTS and the second flat surface FL2 disposed between the light incident surface INS and the slant surface SL and substantially parallel to the bottom surface BTS. Therefore, the first flat surface FL1 and the second flat surface FL2 are disposed such that the slant surface SL is disposed between the first and second flat surfaces FL1 and FL2.

In the present exemplary embodiment, the first flat surface FL1 is disposed to correspond to the display area of the display panel DP. The slant surface SL and the second flat surface FL2 are disposed to correspond to the non-display area. Thus, the slant surface SL and the second flat surface FL2 are covered by the top chassis TC when viewed in a plan view. However, the positions of the first flat surface FL1, the slant surface LS, and the second flat surface FL2 should not be limited thereto or thereby.

The optical sheets OPS are disposed between the light guide plate LGP and the display panel DP. The optical sheets OPS improves the efficiency of the light generated by the light source part LSP and controls the direction in which the light travels. In the present exemplary embodiment, the optical sheets OPS are configured to include three optical sheets, e.g., a diffusion sheet DFS, a prism sheet PRS, and a protection sheet PRTS, which are sequentially stacked on the light guide plate LGP.

The diffusion sheet DFS diffuses the light. The prism sheet PRS condenses the light diffused by the diffusion sheet DFS to allow the diffused light to travel in a direction substantially vertical to the plane surface of the display panel DP. The light exiting from the prism sheet PRS is vertically incident to the display panel DP. The protection sheet PRTS is disposed on the prism sheet PRS. The protection sheet PRTS protects the prism sheet PRS from external impacts. In the present exemplary embodiment, the optical sheets OPS are configured to include one diffusion sheet DFS, one prism sheet PRS, and one protection sheet PRTS, but they should not be limited thereto or thereby. For instance, at least one of the diffusion sheet DFS, the prism sheet PRS, and the protection sheet PRTS may be provided in a plural number, or one or more of the diffusion sheet DFS, the prism sheet PRS, and the protection sheet PRTS may be omitted from the optical sheets OPS. In addition, the diffusion sheet DFS, the prism sheet PRS, and the protection sheet PRTS may be stacked or layered in various ways.

The reflection plate RF is disposed under the light guide plate LGP to reflect the light leaked from the light guide plate LGP without being directed to the display panel DP, and the light reflected by the reflection plate RF travels to the display panel DP. The reflection plate RF is disposed on the bottom chassis BC to reflect the light. As a result, the amount of the light traveling to the display panel DP increases by the reflection plate RE.

The bottom chassis BC accommodates the display panel DP, the mold frame MF, the light source part LSP, the optical sheets OPS, and the reflection plate RF. The bottom chassis BC includes a bottom portion on which the backlight unit BLU is disposed and a sidewall extending upward from the bottom portion along the third direction D3.

The top chassis TC is disposed on the display panel DP. The top chassis TC supports a front edge of the display panel DP and covers the side surfaces of the mold frame MF and the bottom chassis BC. The top chassis TC is provided with a display window WD formed therethrough to expose the display area of the display panel DP.

Figure 11:
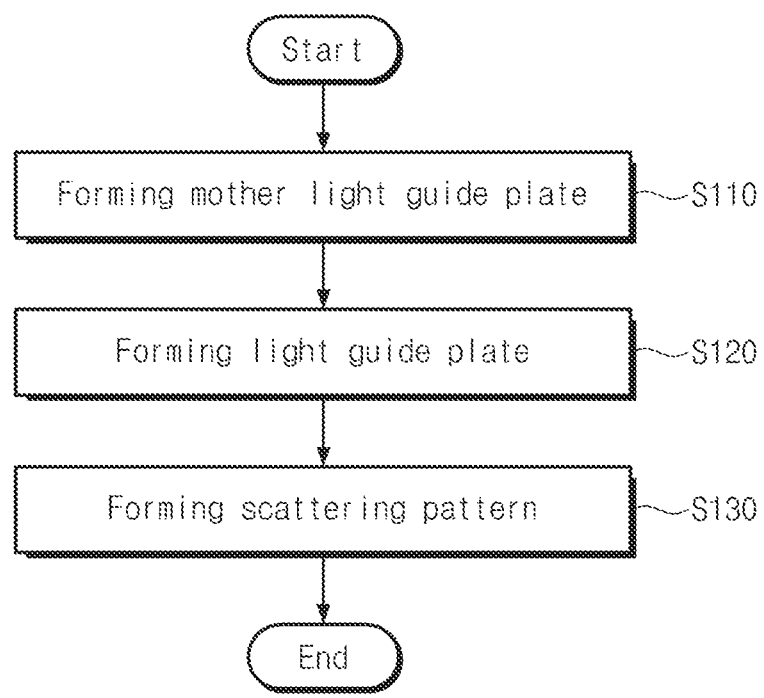
FIG. 11 is a flowchart showing a method of manufacturing a light guide plate according to an exemplary embodiment of the present disclosure.

FIG. 11 is a flowchart showing a method of manufacturing a light guide plate according to an exemplary embodiment of the present disclosure.

Referring to FIG. 11, the light guide plate is manufactured by forming a mother light guide plate (S110), cutting the mother light guide plate to form the light guide plate (S120), and forming the scattering patterns on the light guide plate (S130).

The mother light guide plate is formed by pressurizing a material prepared for the light guide plate using an extrusion roller. That is, the light guide plate is manufactured by an extrusion method. When the material for the light guide plate is pressurized by the extrusion roller, the mother light guide plate has a shape corresponding to the shape of the extrusion roller.

Figure 12:
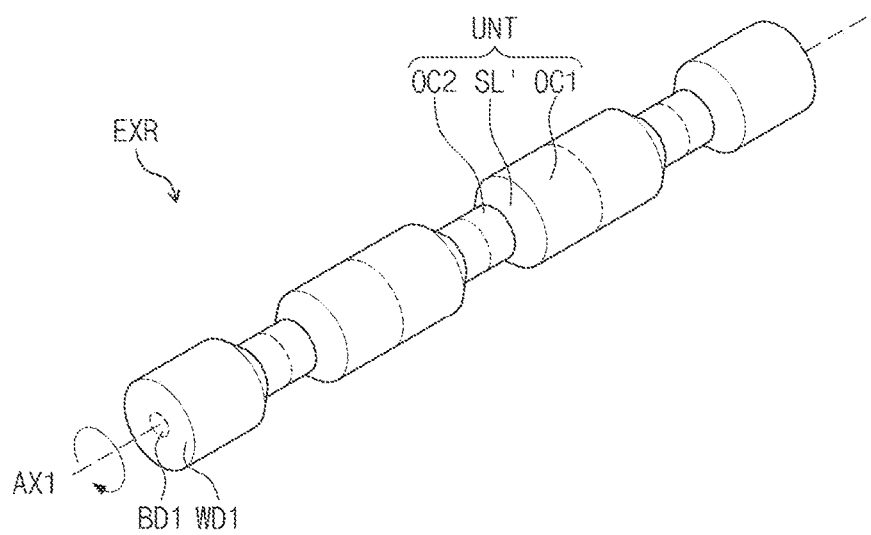
FIG. 12 is a perspective view showing an extrusion roller for a light guide plate.
Figure 13:
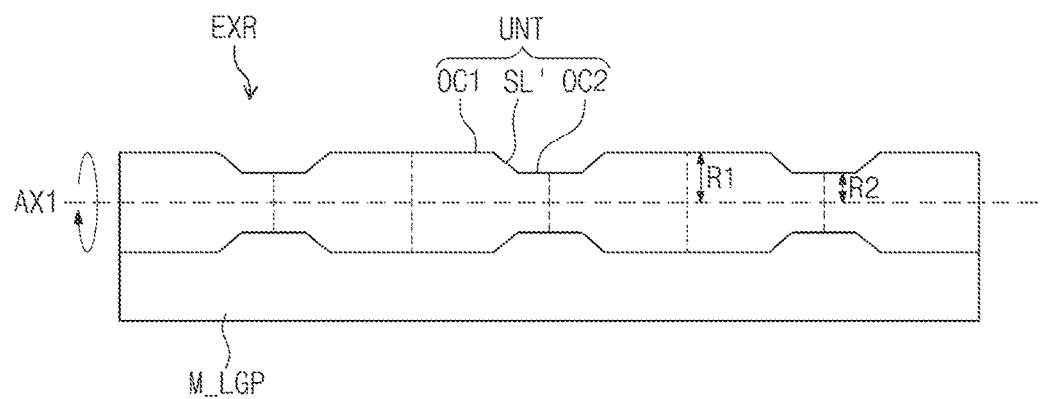
FIG. 13 is a cross-sectional view showing a mother light guide plate manufactured by an extrusion method using the extrusion roller shown in FIG. 12.
Figure 14:
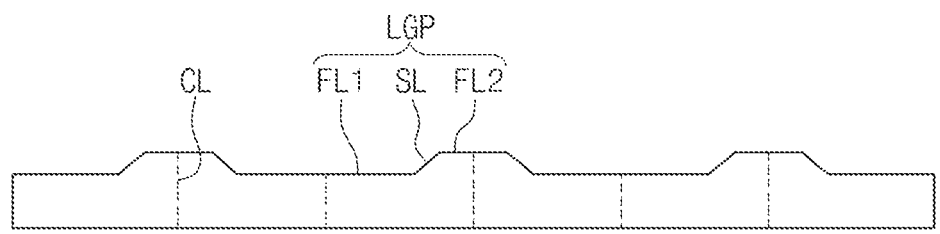
FIG. 14 is a cross-sectional view showing the mother light guide plate manufactured by the method shown in FIG. 11.

FIG. 12 is a perspective view showing an extrusion roller EXR for the light guide plate. FIG. 13 is a cross-sectional view showing the mother light guide plate M_LGP manufactured by the extrusion method using the extrusion roller EXR shown in FIG. 12. FIG. 14 is a cross-sectional view showing the mother light guide plate manufactured by the method shown in FIG. 11.

Referring to FIGS. 12 to 14, the extrusion roller EXR for the light guide plate includes a cylindrical-shaped body that is rotatable with respect to an axis thereof and an outer circumference portion surrounding the body. The body and the outer circumference portion will be respectively referred to as a first body BD1 and a first outer circumference portion WD1 to be distinct from other portions described later.

The first body BD1 is a cylinder having a first axis AX1. The first axis AX1 extends in a direction in which the cylinder extends and serves as a rotational axis of the first body BD1. The first circumference portion WD1 wraps the cylinder along an outer circumference of the cylinder. The first circumference portion WD1 is provided with a bit recessed from a surface of the first outer circumference portion WD1 to the first axis AX1.

In the present exemplary embodiment, when the extrusion roller EXR is cut in a direction substantially perpendicular to the first axis AX1, the first outer circumference portion WD1 includes a first outer circumference surface OC1 having a first radius R1 from the first axis AX1, a second outer circumference surface OC2 having a second radius R2 from the first axis AX1, which is smaller than the first radius R1, and a counter-slant surface SL' connecting the first and second outer circumference surfaces OC1 and OC2. In an embodiment, the first and second outer circumference surfaces OC1 and OC2 have a concentric circle shape with respect to the first axis AX1, but have different radiuses from each other.

The first outer circumference surface OC1, the counter-slant surface SL', and the second outer circumference surface OC2 respectively correspond to the first flat surface FL1, the slant surface SL, and the second flat surface FL2 of the light guide plate LGP. Thus the first outer circumference surface OC1, the counter-slant surface SL', and the second outer circumference surface OC2 form a light guide plate-forming unit UNT used to form the light guide plate LGP configured to include the first flat surface FL1, the slant surface SL, and the second flat surface FL2. FIG. 12 shows a plurality of light guide plate-forming units UNT and a boundary between the light guide plate forming units UNT adjacent to each other is indicated by a dotted line.

The light guide plate-forming units UNT are connected to each other one after another along the first axis AX1. In the present exemplary embodiment, the first outer circumference surface OC1, the counter-slant surface SL', and the second outer circumference surface OC2 in each light guide plate-forming unit UNT are sequentially connected to each other in order of the first outer circumference surface OC1, the counter-slant surface SL', and the second outer circumference surface OC2, but they should not be limited thereto or thereby. For instance, the first outer circumference surfaces OC1 of the light guide plate-forming units UNT adjacent to each other make contact with each other and the second outer circumference surfaces OC2 of the light guide plate-forming units UNT adjacent to each other make contact with each other.

In the present exemplary embodiment, a mark indicating the boundary between two adjacent light guide plate-forming units UNT may be marked between the two adjacent light guide plate-forming units UNT. The mark may be, but not limited to, a groove having a line or dotted line-shape.

Although not shown in figures, a portion at which the first outer circumference surface OC1 makes contact with the counter-slant surface SL' and a portion at which the counter-slant surface SL' makes contact with the second outer circumference surface OC2 may have a round shape in consideration of moldability of the material for the light guide plate LGP.

The first body BD1 may be integrally formed with the first outer circumference portion WD1. For instance, the extrusion roller EXR is formed by forming a cylinder using a single material and processing an outer portion of the cylinder to form the first outer circumference portion WD1 having a desired shape, but it should not be limited thereto or thereby. That is, the extrusion roller EXR may be formed by forming the first body BD1 and the first outer circumference portion WD1 separately from the first body BD1 and wrapping the first body BD1 with the first outer circumference portion WD1.

In the light guide plate-forming unit UNT, a length of each of the first outer circumference surface OC1, the counter-slant surface SL', and the second outer circumference surface OC2 and a degree of the slant of the counter-slant surface SL' are determined depending on the size of the light guide plate LGP and its use.

The extrusion roller EXR rotates in one direction with respect to the first axis AX1. In FIG. 12, the extrusion roller EXR rotates in a clockwise direction, but it should not be limited thereto or thereby.

Referring to FIGS. 13 and 14 again, the extrusion roller EXR rotates while pressurizing the material for the light guide plate LGP, and thus the mother light guide plate M_LGP is formed.

The material prepared for the light guide plate LGP is semi-cured without being completely cured. That is, the material is not cured or partially cured. Accordingly, when the material for the light guide plate LGP is pressurized by the extrusion roller EXR, the shape of the outer circumference surface of the extrusion roller EXR is transferred to the material since the material is not completely cured.

Therefore, the first outer circumference surface OC1, the counter-slant surface SL', and the second outer circumference surface OC2 of the extrusion roller EXR make contact with the material to form the first flat surface FL1, the slant surface SL, and the second flat surface FL2 of the mother light guide plate M_LGP. A difference in thickness between the first outer circumference surface OC1 and the second outer circumference surface OC2 is substantially equal to a difference between a distance from the bottom surface BTS to the first flat surface FL1 of the mother light guide plate M_LGP and a distance from the bottom surface BTS to the second flat surface FL2 of the mother light guide plate M_LGP.

Then, the extrusion roller EXR is cut into the light guide plate-forming units UNT using a cutter, and the mother light guide plate M_LGP formed by pressurizing the material using the extrusion roller EXR is cut by the cutter. Accordingly, the light guide plate LGP configured to include the first flat surface FL1, the slant surface SL, and the second flat surface FL2 is formed, and the cut surface of the mother light guide plate M_LGP becomes the light incident surface or the opposite surface of the light guide plate LGP. Although not shown in figures, the first and second side surfaces are cut by the cutter.

According to the present exemplary embodiment, when the boundary between the adjacent light guide plate-forming units UNT is marked as a cutting line CL, the light guide plate LGP is formed by cutting the mother light guide plate M_LGP along the cutting line CL. The cutting method of the mother light guide plate M_LGP should not be limited to a specific method.

Then, the scattering patterns are formed on the light guide plate LGP. The scattering patterns are formed on a surface of the light guide plate LGP using a roll stamper.

Figure 15:
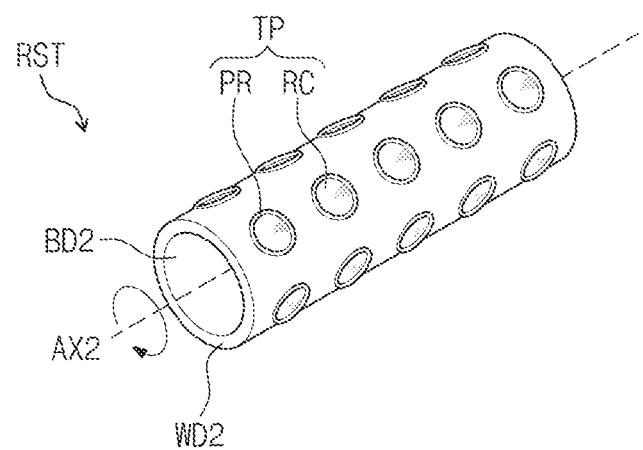
FIG. 15 is a perspective view showing a roll stamper for a light guide plate.

FIG. 15 is a perspective view showing the roll stamper RST for the light guide plate.

Referring to FIG. 15, the roll stamper RST includes a body that is rotatable with respect to an axis and an outer circumference portion wrapping the body. The body and the outer circumference portion are respectively referred to as a second body BD2 and a second outer circumference portion WD2 to be distinct from those of the extrusion roller EXR.

The second body BD2 is a cylinder having a second axis AX2. The second axis AX2 extends in a direction, in which the cylinder extends, and serves as a rotational axis of the second body BD2. The second outer circumference portion WD2 wraps the cylinder, e.g., then second body BD2, along an outer circumference of the cylinder.

A transfer pattern TP is formed on the second outer circumference portion WD2. The transfer pattern TP is protruded from or recessed from a surface of the second outer circumference portion WD2. The transfer pattern TP is used to form the scattering pattern SCP, and thus the transfer pattern TP has a substantially reversed shape of the scattering pattern SCP.

The second outer circumference portion WD2 is manufactured by preparing a flat plate, forming the transfer pattern TP on the flat plate, and wrapping the flat plate, on which the transfer pattern TP is formed, on the second body BD2.

Figure 16:
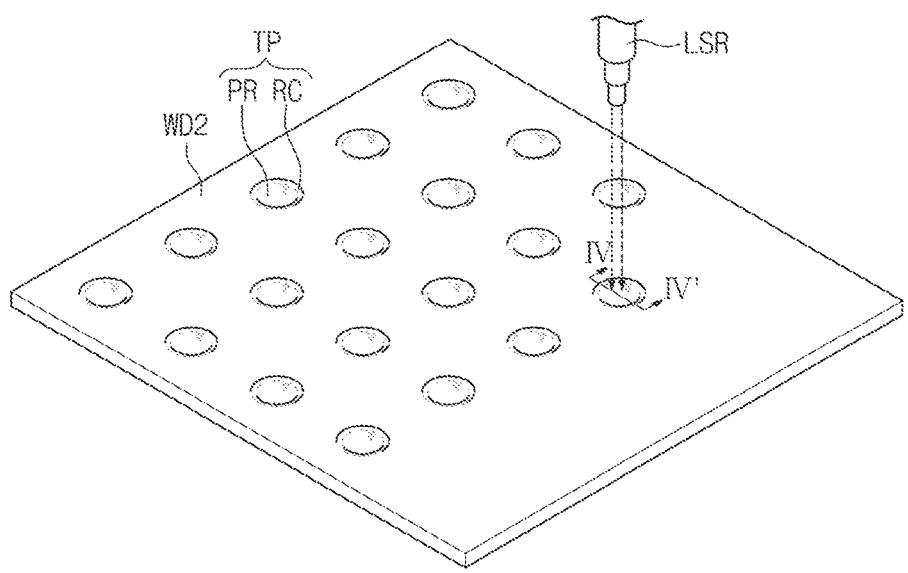
FIG. 16 is a perspective view showing forming of a transfer pattern on a flat surface among processes of forming the roll stamper shown in FIG. 15.
Figure 17:
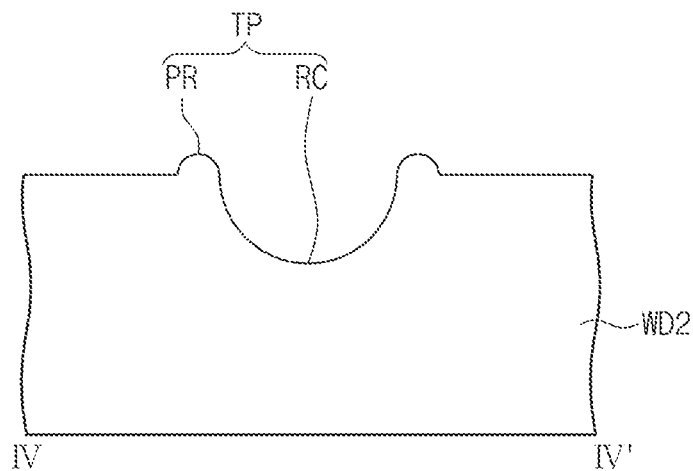
FIG. 17 is a cross-sectional view taken along a line IV-IV' of FIG. 16.

FIG. 16 is a perspective view showing forming of the transfer pattern on the flat plate among processes of forming the roll stamper shown in FIG. 15. FIG. 17 is a cross-sectional view taken along a line IV-IV' of FIG. 16.

Referring to FIGS. 16 and 17, a plurality of recesses RC and a plurality of protrusion portions PR are formed on the second outer circumference portion WD2 having the flat plate shape.

The second outer circumference portion WD2 has flexibility or solidity. When the second outer circumference portion WD2 has the solidity, a thickness of the second outer circumference portion WD2 is thin enough to have the flexibility. In the present exemplary embodiment, the second outer circumference portion WD2 is formed of a stainless material, but it should not be limited thereto or thereby.

The transfer pattern TP is formed by irradiating a laser LSR on the second outer circumference portion WD2. When the laser LSR is irradiated on the surface of the second outer circumference portion WD2, the recesses RC recessed from the surface of the second outer circumference portion WD2 and the protrusion portions PR arranged around the recesses RC are formed. The protrusion portions PR may be, but not limited to, a burr formed by a portion of the material of the second outer circumference portion WD2, which is melted and squeezed out while the laser LSR is irradiated on the second outer circumference portion WD2.

The roll stamper RST is used to form the scattering pattern SCP on the surface of the light guide plate LGP. The transfer pattern TP of the roll stamper RST is transferred to the surface of the light guide plate LGP when the roll stamper RST rotates and pressurizes the surface of the light guide plate LGP. As a result, the scattering pattern SCP is formed on the surface of the light guide plate LGP.

Figure 18:
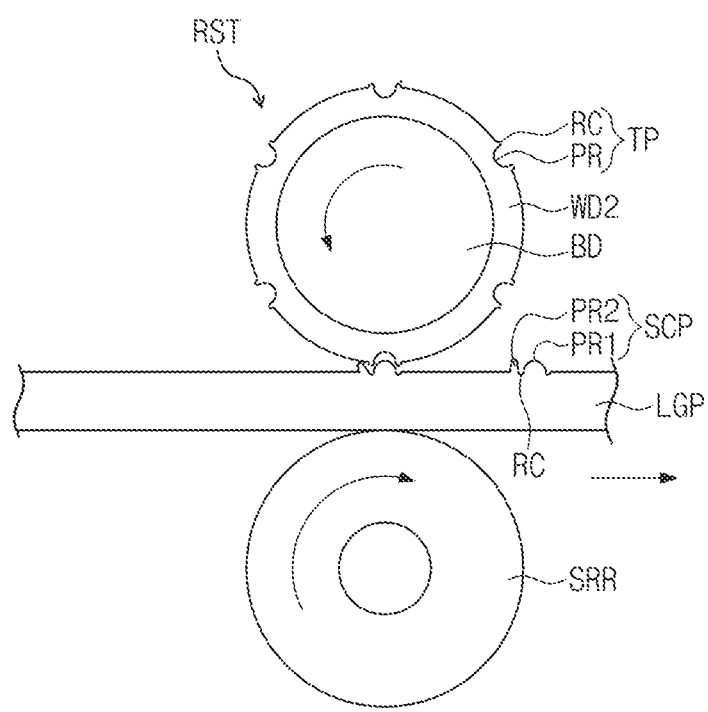
FIG. 18 is a cross-sectional view showing forming of a scattering pattern on a light guide plate using a roll stamper.

FIG. 18 is a cross-sectional view showing forming of the scattering pattern SCP on the light guide plate LGP using the roll stamper RST.

Referring to FIG. 18, a support roller SRR is further disposed adjacent to the roll stamper RST. The support roller SRR is spaced apart from the roller stamper RST by a predetermined distance. The light guide plate LGP is disposed between the roller stamper RST and the support roller SRR to form the scattering pattern SCP. The support roller SRR supports the roll stamper RST while the light guide plate LGP is disposed between the support roller SRR and the roll stamper RST when the roll stamper RST pressurizes the light guide plate LGP to transfer the transfer pattern TP. Accordingly, the light guide plate LGP disposed between the roll stamper RST and the support roller SRR is tightly supported by the roll stamper RST and the support roller SRR.

The roll stamper RST rotates in a predetermined direction, e.g., a counter clockwise direction, and the support roller SRR rotates in a direction, e.g., a clockwise direction, opposite to the direction in which the roller stamper RST rotates. The light guide plate LGP is provided to between the roll stamper RST and the support roller SRR. In the present exemplary embodiment, the scattering pattern SCP is formed on the bottom surface BTS rather than the light exit surface OTS. Accordingly, the light guide plate LGP is provided between the roll stamper RST and the support roller SRR such that the light exit surface OTS of the light guide plate LGP makes contact with the support roller SRR and the bottom surface BTS of the light guide plate LGP makes contact with the roll stamper RST. The light guide plate LGP moves in a direction indicated by an arrow, and thus the scattering pattern SCP is formed on the bottom surface BTS making contact with the roll stamper RST.

The transfer pattern TP has the reversed shape of the scattering pattern SCP. Therefore, the scattering pattern SCP corresponding to the transfer pattern TP is formed on the surface of the light guide plate LGP. The first protrusion portion PR1 of the scattering pattern SCP is formed by transferring the recess RC of the transfer pattern TP and the recess portion RC is formed by transferring the protrusion portion PR of the transfer pattern TP.

The light guide plate LGP is semi-cured without being completely cured. That is, the material prepared for the light guide plate LGP is not cured or partially cured. Accordingly, when the material for the light guide plate LGP is pressurized by the roll stamper RST, the shape of the outer circumference surface of the roll stamper RST is transferred to the material since the material is not completely cured.

During the transfer of the transfer pattern TP on the light guide plate LGP, the second protrusion portion PR2 of the scattering pattern SCP is formed. When the roll stamper RST rotates in a direction from one end of the light guide plate LGP to the other end of the light guide plate LGP to transfer the transfer pattern TP on the surface of the light guide plate LGP, the second protrusion portion PR2 is formed at a position relatively closer to the other end of the light guide plate LGP with respect to a line crossing a center of the first protrusion portion PR1 and substantially parallel to the second axis AX2. Thus, referring to FIG. 4, when the line crossing the center of the first protrusion portion PR1 and dividing the first protrusion portion PR1 into two regions is referred to as the imaginary line IL, one region of the two regions divided by the imaginary line IL is referred to as the first region RG1, and the other region of the two regions is referred to as the second region RG2. The first region RG1 is disposed relatively closer to the other end of the light guide plate LGP and the second region RG2 is disposed relatively closer to the one end of the light guide plate LGP.

The structure that the second protrusion portion PR2 is formed relatively closer to the other end is caused by the roll transfer method using the roll stamper RST. The roll stamper RST pressurizes the light guide plate LGP while rotating, and thus the transfer pattern TP of the roll stamper RST is transferred to the light guide plate LGP. In this case, the portion of the light guide plate LGP, which is pressurised by the roll stamper RST, is pushed in a direction opposite to the direction in which the roll stamper RST travels since the roll stamper RST pushes the light guide plate LGP while rotating. The pushed portion of the light guide plate LGP corresponds to the second protrusion portion PR2 protruded from the surface of the light guide plate LGP. Accordingly, the position of the second protrusion portion PR is determined by the rotating direction of the roll stamper RST and formed on the surface of the light guide plate LGP in the direction opposite to the direction in which the light guide plate LGP moves with respect to the roll stamper RST.

As described above, the mother light guide plate for the light guide plate is manufactured by the extrusion method.

The light guide plate manufactured by the extrusion method has material properties, e.g., thickness, residual stress, melt mass flow rate, tensile modulus, flexural strength, etc., which are different from those of the light guide plate manufactured by the injection method.

In detail, the thickness of the light guide plate manufactured by the extrusion method is relatively thinner than that of the light guide plate manufactured by the injection method. In the present exemplary embodiment, the light guide plate manufactured by the extrusion method has the thickness of about 100 micrometers to about 400 micrometers. When the light guide plate includes the first and second flat surfaces, the height between the bottom surface and the first flat surface is in a range from about 300 micrometers to about 340 micrometers and the height between the bottom surface and the second flat surface is in a range from about 340 micrometers to about 400 micrometers. The height between the bottom surface and the first flat surface is smaller than the height between the bottom surface and the second flat surface.

In addition, the thickness of the light guide plate is varied depending on the display panel in which the light guide plate is employed. For instance, the thickness of the light guide plate applied to a large size television set is different from the thickness of the light guide plate applied to a small size cellular phone. When the light guide plate includes the first and second flat surfaces, a maximum difference between the height from the bottom surface to the first flat surface and the height from the bottom surface to the second flat surface is about 1.5 mm.

The residual stress means the stress remaining in a material after an external force applied to the material is stopped. Accordingly, the residual stress is different according to the manufacturing process used to form the light guide plate even though the light guide plate is formed using the same material. In detail, when the light guide plate is manufactured by the injection method, the material prepared for the light guide plate may flow in a mold along a uniform direction while the material is injected. Then, when the injected material is cured as it is, first and second positions having different residual stresses occur in the light guide plate. In an embodiment, the first position indicates an arbitrary position outside or inside the light guide plate and the second position indicates an arbitrary position different from the first position.

In comparison, when the light guide plate is manufactured by the extrusion method, the light guide plate has uniform residual stress over the entire area of the light guide plate. That is, when the residual stress is measured at plural positions of the manufactured light guide plate, the methods, e.g., the extrusion method or the injection method, used to manufacture the light guide plate may be distinguished using various inspection methods. As the inspection methods, a destructive inspection, e.g., a cutting method, a drilling method, etc., and a non-destructive inspection using an x-ray or ultrasonic waves are widely used.

The melt mass flow rate means an extrusion speed of a melted resin extruding through a die having fixed length and diameter in accordance with a position of piston in a cylinder, and the extrusion speed is obtained by measuring a volume of the melted resin extruding during a predetermined time period. The melt mass flow rate is measured by using a plastomer.

The melt mass flow rate of the light guide plate manufactured by the extrusion method is smaller than that of the light guide plate manufactured by the injection method. In the present exemplary embodiment, the melt mass flow rate of the light guide plate manufactured by the extrusion method is in a range from about 20 $cm^3$/10 min to about 60 $cm^3$/10 min, but it should not be limited thereto or thereby.

The tensile modulus means a modulus coefficient that indicates a degree of stretch and a degree of variation of an object when the object is stretched in both directions. The tensile modulus is measured using a tensile strength tester. That is, the tensile modulus is obtained by measuring a stress-strain curve and calculating a slope of the stress-strain curve.

The tensile modulus of the light guide plate manufactured by the extrusion method is smaller than that of the light guide plate manufactured by the injection method. In the present exemplary embodiment, the tensile modulus of the light guide plate manufactured by the extrusion method is in a range from about 1800 Mpa to about 2200 Mpa, but it should not be limited thereto or thereby.

The flexural strength means a maximum flexural stress when the material is in an elastic modulus. The flexural strength is obtained by applying a weight to the object in a longitudinal direction of the object.

The flexural strength of the light guide plate manufactured by the extrusion method is smaller than that of the light guide plate manufactured by the injection method. In the present exemplary embodiment, the flexural strength of the light guide plate manufactured by the extrusion method is in a range from about 85 Mpa to about 95 Mpa, but it should not be limited thereto or thereby.

Although the exemplary embodiments have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A light guide plate comprising:
    a light incident surface to which a light is configured to be incident;
    a light exit surface from which the light incident through the light incident surface is configured to exit;
    a bottom surface facing the light exit surface configured to reflect at least a portion of the incident light; and
    a scattering pattern disposed on the bottom surface,
    wherein the scattering pattern consists of:
        a first protrusion portion protruding from the bottom surface;
        a recess portion disposed along a circumference of the first protrusion portion and recessed from the bottom surface; and
        a second protrusion portion spaced apart from the first protrusion portion and disposed along a portion of the recess portion, wherein the first protrusion portion has a circular shape and the second protrusion portion is disposed only in a first region with respect to an imaginary line crossing a center of the first protrusion portion and dividing the scattering pattern into the first region and a second region.

2. The light guide plate of claim 1, wherein the second protrusion portion is disposed along at least a portion of the recess portion disposed in the first region.

3. The light guide plate of claim 1, wherein the first protrusion portion has a height different from a height of the second protrusion portion.

4. The light guide plate of claim 1, wherein the light exit surface comprises a slant surface disposed adjacent to the light incident surface and slanted towards the bottom surface.

5. The light guide plate of claim 4, wherein the slant surface becomes farther away from the bottom surface as a distance from the light incident surface becomes smaller.

6. The light guide plate of claim 5, wherein the light exit surface further comprises:
    a first flat surface substantially parallel to the bottom surface; and
    a second flat surface disposed between the light incident surface and the slant surface and substantially parallel to the bottom surface.

7. The light guide plate of claim 6, wherein a thickness between the bottom surface and the second flat surface is greater than a thickness between the bottom surface and the first flat surface.

8. The light guide plate of claim 1, wherein the scattering pattern is provided in a plural number.

9. The light guide plate of claim 8, wherein the scattering patterns have different sizes from each other.

10. The light guide plate of claim 8, wherein the scattering patterns are regularly arranged along at least one of row and column directions.

11. The light guide plate of claim 8, wherein the first protrusion portion of each of the scattering patterns has a circular shape, the second protrusion portion is disposed only in a first region with respect to imaginary lines each crossing a center of the first protrusion portion and dividing a corresponding scattering pattern of the scattering patterns into the first region and a second region, and the imaginary lines are substantially parallel to each other.

12. A light guide plate comprising:
    a light incident surface to which a light is configured to be incident;
    a light exit surface from which the light incident through the light incident surface is configured to exit;
    a bottom surface facing the light exit surface configured to reflect at least a portion of the incident light; and
    a scattering pattern disposed on the bottom surface,
    wherein the scattering pattern comprises:
        a first protrusion portion having a circular shape and protruding from the bottom surface;
        a recess portion disposed along a circumference of the first protrusion portion and recessed from the bottom surface; and
        a second protrusion portion spaced apart from the first protrusion portion and disposed along a portion of the recess portion,
    wherein scattering pattern is divided into the first region and a second region with respect to an imaginary line crossing a center of the first protrusion portion,
    the second protrusion portion is disposed only in a first region, and
    the maximum height in a portion of the first region, which is not overlapped with the first protrusion, is higher than the maximum height in a portion of the second region, which is not overlapped with the first protrusion.

* * * * *